United States Patent [19]
Kuwada

[11] 3,751,813
[45] Aug. 14, 1973

[54] SLIDE RULE AND COMPASS DEVICE

[76] Inventor: Edward A. Kuwada, 1053 S. Kingsley Dr., Los Angeles, Calif. 90006

[22] Filed: Nov. 11, 1971

[21] Appl. No.: 197,791

[52] U.S. Cl. .................................. 33/27 C, 33/158
[51] Int. Cl. ............................................... B43l 9/04
[58] Field of Search .................... 33/27 C, 158, 173, 33/188, 143 I, 107, 111

[56] References Cited
UNITED STATES PATENTS

| | | | |
|---|---|---|---|
| 2,874,478 | 2/1959 | Faulconer | 33/143 M |
| 3,156,981 | 11/1964 | Sutton | 33/27 C |
| 2,832,141 | 4/1958 | Taylor | 33/27 C |
| 1,396,806 | 11/1921 | Beals | 33/189 |
| 1,470,470 | 10/1923 | Pas | 33/189 |
| 2,677,186 | 5/1954 | Sorensen | 33/143 I |
| 1,826,081 | 10/1931 | Magers | 33/107 R |
| 2,143,559 | 1/1939 | Keuffel | 33/107 R |

*Primary Examiner*—Harry N. Haroian
*Attorney*—William P. Green

[57] ABSTRACT

A combined slide rule and compass device including a slide rule type body and an elongated main slide mounted for longitudinal movement within a guideway in the body, with two external slide elements being disposed about the body and carrying a pair of compass points which are adjustable toward and away from one another for use in drawing or measuring circles. One of these external slides also carries a hairline for coaction with the scales on the body and main slide in making a slide rule calculation. Preferably, the main slide has an enlarged head at one of its ends, which may be detachable from the main slide and onto which at least one and preferably both of the external slides are movable to a retracted position in which they do not interfere with use of the device as a conventional marking or measuring ruler.

15 Claims, 11 Drawing Figures

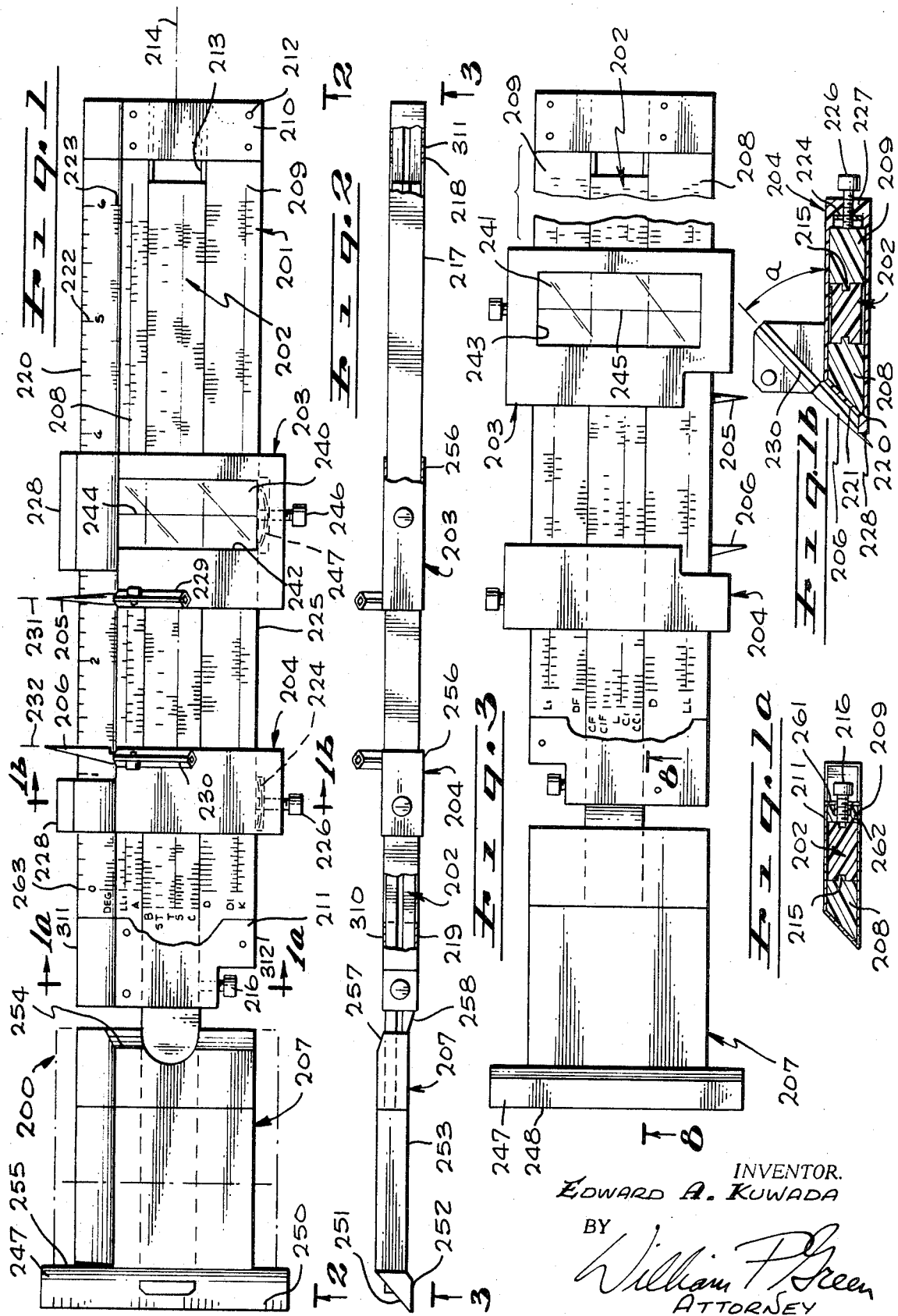

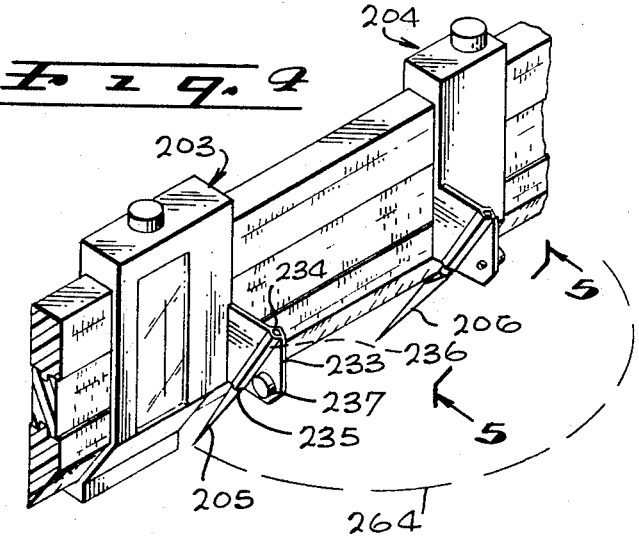
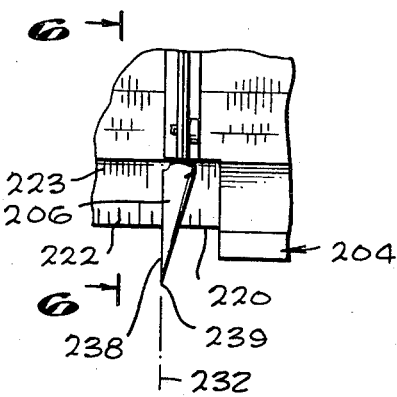
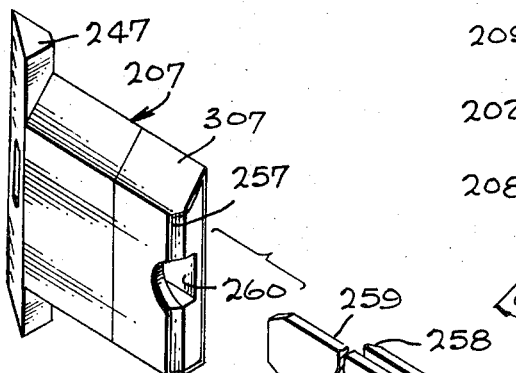
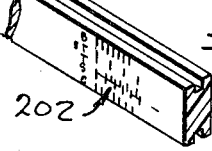
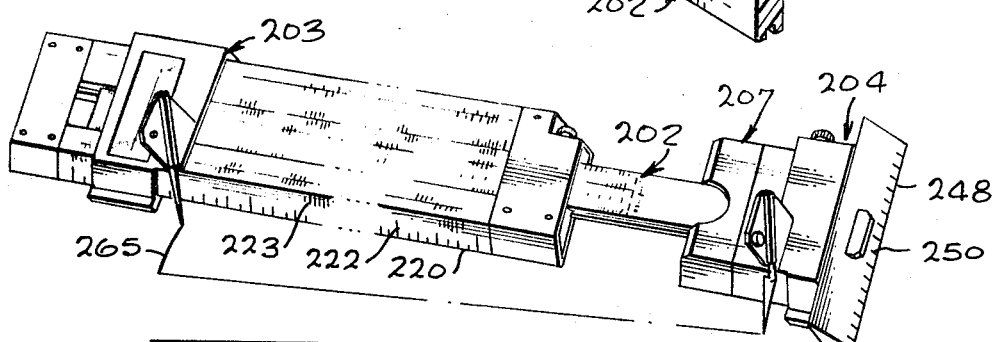
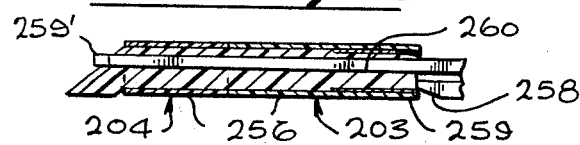

SLIDE RULE AND COMPASS DEVICE

CROSS REFERENCE TO RELATED APPLICATION

The device of the present invention constitutes an improvement on the unit disclosed and claimed in my copending application Ser. No. 115,541 filed Feb. 16, 1971 on "Rule and Compass Device".

BACKGROUND OF THE INVENTION

This invention relates to a unique multiple purpose drafting and calculating instrument.

In my above identified prior application, I have disclosed a drafting and calculating device for use by engineers, scientists, students, and the like, which device is adapted to be used selectively either as a slide rule or as a beam compass for drawing or measuring circles or arcs. Structurally, the device disclosed in that application includes a rule body similar in some respects to the body of a conventional slide rule, and an elongated main slide mounted within a guideway in the body and carrying scales coacting with scales on the main body for performing slide rule calculations. An indicator slide is disposed about the body, and carries an index marking to be read against the scales on both the body and the main slide. This auxiliary slide also carries one of two compass points which are utilized in employing the device as a beam compass. A third slide is contained within the guideway of the slide rule body, at a location axially beyond the mentioned main slide, and carries the second of the compass points.

SUMMARY OF THE INVENTION

The present invention provides improvements in the device of the above discussed prior application, for facilitating the slide rule use of the device, and otherwise increasing the versatility of the instrument while simplifying its structure. In accordance with the present invention, the "third slide", which carries the second of the two compass points, is disposed about the outside of the slide rule body, rather than within the guideway in that body, so that neither of the slides interferes in any way with longitudinal movement of the main slide to any desired setting relative to the slide rule body. Thus, the min slide can be moved freely to positions of projection beyond either end of the slide rule body, so that both ends of all scales on both the body and main slide can be used just as freely as in a conventional slide rule. Further, the two external slides disposed about the outside of the body can both be moved freely relative to the body and relative to one another to any desired relative setting for drawing or measuring circles of any radius. Preferably, means are provides for releasably locking these two slides in any selected position along the rule body.

As in my prior application, it is desirable that the elongated main slide carry at one of its ends beyond the rule body an enlarged head, which may have a straight edge disposed transversely of the body, for use in drawing lines extending in that direction, or for assuming a position of alignment with such a line. At least one and preferably both of the point carrying slides are movable longitudinally off of the rule body and to a retracted position of reception about this enlarged head, in a relation enabling use of the rule body as a conventional straight edge for drawing straight lines or taking linear measurements. To allow for the previously discussed free movement of the main slide in either direction relative to the rule body, it is desirable that the mentioned enlarged head be connected detachably to the main slide, so that it may be removed during slide rule operation. Also, a particular feature of the invention relates to the provision of locking means for releasably securing the main slide in any desired setting relative to the rule body, with one of the external slides being secured to the enlarged head on the main slide and the other being secured to the rule body, so that the entire assembly may be employed as an extended length beam compass in which the length of the main slide may in effect be added to the length of the rule body to draw an arc or circle having a radius near the combined length of the two parts.

Certain additional features of the invention relate to a unique way of mounting the compass points to extend generally parallel to and thus be readable visually against a beveled or angularly disposed scale carrying surface on the rule body, and further in a novel manner of constructing one of the points to have a straight edge at one side aligned with a sharp end of the point and disposed directly transversely of the direction of sliding movement of the point, to again facilitate reading of the position of that point relative to a coacting measuring scale.

BRIEF DESCRIPTION OF THE DRAWINGS

The above and other features and objects of the invention will be better understood from the following detailed description of the typical embodiment illustrated in the accompanying drawings, in which:

FIG. 1 is a plan view showing a combined slide rule and beam compass device embodying the invention;

FIGS. 1a and 1b are transverse sections taken on lines 1a—1a and 1b—1b of FIG. 1;

FIG. 2 is a front edge view taken on line 2—2 of FIG. 1;

FIG. 3 is a bottom plan view taken on line 3—3 of FIG. 2;

FIG. 4 is a fragmentary perspective view showing the device as it appears when in use as a beam compass;

FIG. 5 is an enlarged fragmentary view taken on line 5—5 of FIG. 4 and showing one of the compass points;

FIG. 6 is a side view of the compass point taken on line 6—6 of FIG. 5;

FIG. 7 is a fragmentary perspective view showing the manner in which the enlarged head is detachable from the main slide of the device;

FIG. 8 is an enlarged view which may be considered as taken on line 8—8 of FIG. 3, but with the two external slides of the device being shifted to positions of reception about the enlarged head; and FIG. 9 is a perspective view showing the device as it appears when in use as an extended length beam compass.

DESCRIPTION OF THE PREFERRED EMBODIMENT

Referring to FIG. 1, the device 200 includes a slide rule body 201, a main elongated slide 202, two external slides 203 and 204 mounted about and movable along body 201, two compass points 205 and 206 carried by external slides 203 and 204, and an enlarged head 207 connected to an end of main slide 202. Body 201 is in most respects constructed essentially the same as a conventional slide rule body, consisting of two elongated parallel sections 208 and 209 which are secured together at opposite ends by two preferably metal loop-form end brackets or connectors 210 and 211, attached to sections 208 and 209 in any convenient manner as by screws represented at 212. Sections 208 and 209 are spaced apart to form therebetween a guideway 213 extending parallel to the longitudinal axis 214 of the device and within which the main slide 202 is mounted for sliding movement along axis 214 to any desired setting relative to body 201. As seen in FIGS. 1a and 1b, the slide 202 may have longitudinal grooves 215 formed in its opposite sides receiving coacting longitudinal tongues formed on sections 208 and 209 of the rule body, with the slide being a sufficiently tight fit within guideway 213 to be frictionally retained in any desired set position relative to the rule body, but with the slide being forcibly manually displaceable from any set position to another position when desired. Sections 208 and 209 of the body may have the same cross section illustrated in FIG. 1b along their entire length, except at the locations of end connector brackets 210 and 211. At the left end connector 211, both of the body sections 208 and 209 may be reduced slightly in external dimension, sufficiently to enable the outer surfaces 310, 311, 312, and 219 of connector 211 to be aligned in the same planes with and in effect form continuations of the corresponding outer surfaces of the two body sections 208 and 209. Section 209 may also be further cut away at the location of a lock screw 216 (see FIGS. 1 and 1a), to enable that screw to be located entirely within the transverse peripheral outline of bracket 211 as defined by its surfaces 310, 311, 312, and 219. At least the undersurfaces 217 of body sections 208 and 209 are also cut away slightly at the right end of the device (at location 311 in FIG. 2), so that the undersurface 218 of connector 210 can be aligned in the same plane as surfaces 217 and the undersurface 219 of connector 211, to present a single flat planar undersurface on the entire body assembly 201.

At 220, the section 208 of body 201 forms a straight edge which extends parallel to the longitudinal axis 214 of the device, and which is defined by the intersection of the planar undersurface 217 of section 208 with a longitudinally extending elongated beveled face 221 disposed at an angle a to surface 217 (see FIG. 6). A correspondingly inclined measuring scale 222 is marked off on beveled face 221 and along edge 220, to give measurements along the edge in any desired units, as for instance in inches, or if preferred in metric units. Desirably, the total length of this scale is 6 inches. An additional scale 223 may be provided along face 221 for giving, in circular degrees, angular measurements along an arc of predetermined radius, as will be indicated more specifically at a later point.

The front and back surfaces of body sections 208 and 209 and main slide 202 also carry a series of conventional logarithmic slide rule scales. More particularly, the front faces of body sections 208 and 209 may typically carry the L1, LL1, A, D, D1 and K scales, while the forward face of slide 202 may carry the B, ST, T, S and C scales (FIG. 1). The back sides of body sections 208 and 209 may carry the L1, DF, D and LL scales, and the back side of the main slide 202 may carry the CF, C1F, L, C1 and CC1 scales (FIG. 3).

External slide 204 forms a rigid loop extending about rule body 201 and the contained slide 202 (see FIG. 1b), and following the peripheral contour of the body assembly to guide slide 204 for only longitudinal sliding movement along axis 214 relative to body 201. Any lateral play between external slide 204 and the rule body may be taken out in conventional manner by a leaf spring 224 contained within a recess in slide 204 and bearing against planar edge surface 225 of body section 209. Slide 204 may be releasably locked in any desired set position along body 201 by a suitable locking or braking mechanism, typically represented as a lock screw 226 threadedly engaging and extending through an edge wall 227 of slide 204 and adapted to be tightened against edge surface 225 of the body to frictionally retain the slide in a set position.

Adjacent measuring scale 222, slide 204 carries one of the compass points 206, at a location to project beyond the plane of edge surfaces 228 of slides 203 and 204 to engage a sheet of paper when the device is used as a beam compass. As will be understood, the two compass points 205 and 206 may both be sharp metal points when the device is to be used solely for measuring and not marking purposes, or one of the two points may take the form of a marking lead when the device is to be employed for drawing an arc. In the figures, the point 205 has been illustrated as such a pencil lead, while the point 206 is typically illustrated as a sharp metal point to be employed as the center of an arc being drawn by lead 205.

Each of the points 205 or 206 is mounted removably and adjustably within an appropriate holder 229 or 230 carried by the associated slide 203 or 204, and constructed to hold the associated point in a position of alignment within a plane 231 or 232 disposed transversely of axis 214, and in a position of angular disposition generally parallel to beveled face 221, as best seen in FIG. 6. Each of the holders 229 and 230 may typically consist of two generally parallel pieces of sheet metal or the like 233 (FIG. 4), which may if desired be formed as portions of a single piece of metal doubled back at 234, and which define between the two pieces of metal an elongated passage 235 dimensioned to receive and externally cylindrical mounting portion 236 of the corresponding point 205 or 206, with the two metal plates being tightenable against one another by a locking screw 237, which causes the plates or holder to tightly grip the point within passage 235 in rigidly retained relation. By loosening of the screw 237, each of the points may be adjusted longitudinally to properly position its sharpened end relative to the body of the device.

As seen best in FIG. 5, the metal point 206 may preferably be shaped in the manner illustrated in that figure to facilitate reading of the point against measuring scales 222 and 223. For this purpose, point 206 may have a straight edge 238 which lies in the previously mentioned plane 232 which extends directly transversely of axis 214 of the device and contains the sharpened end 239 of point 206. Thus, alignment of edge 238 of point 206 with any of the markings on scales 222 or 223 will indicate precisely the setting of sharpened end 239 of the point relative to those scales.

The second external slide 203 may be considered as constructed essentially the same as slide 204, except that point 205 is mounted at the left rather than right side of slide 203, so that the two points 205 and 206 may move into close proximity for measuring or drawing circuits of small size, and further except for the fact that slide 203 is widened somewhat in a left-to-right direction as viewed in FIG. 1, to carry two indicator glasses 240 and 241 at the top and bottom of body 201. These indicator glasses are mounted in fixed position within two top and bottom windows 242 and 243 formed in the upper and lower walls of slide 203, and carry two hairlines 244 and 245 which are aligned in a common plane disposed transversely of axis 214 and closely adjacent the various slide rule scales, to indicate which of the various slide rule scales are in alignment with one another in any desired setting of slide 203. As in the case of slide 204, the slide 203 has a lock screw 246 which can releasably lock slide 203 in any selected position. Lateral play of slide 203 relative to the body may be taken up by an appropriate leaf spring 247.

The enlarged head 207 which is secured to the left end of slide rule stick 202 has a vertically extending left end portion 247 (FIG. 1), forming a straight edge 248 disposed perpendicular to axis 214 and edge 220 and having appropriate scale markings 250 marked off thereon. The upper face 251 of portion 247 adjacent edge 248, on which scale 250 is formed, may be beveled as seen in FIG. 2, to extend at an angle relative to planar undersurface 252 which desirably lies in the same plane as the previously mentioned undersurfaces 217, 218, and 219. To the right of its portion 247, the head 207 has a portion 253 whose cross section between the locations 254 and 255 of FIGS. 1 and 2 is the same as the common external cross section of body sections 208 and 209 and the end connector 211 of the body, so that the two slides 203 and 204 may be slid laterally onto portion 253 of head 207, specifically to the position shown in broken lines in FIG. 1 and in full lines in FIG. 8. This portion 253 of the head, however, while having the same cross section as body 201, is elevated slightly relative to the body (see FIG. 2), so that when slides 203 and 204 are received on the head in the FIG. 8 position, the planar undersurfaces 256 of the slides are aligned with and lie in the same horizontal plane as the previously mentioned undersurfaces 217, 218, 219, and 252 of the body and head. Thus, when the slides are in this retracted position, the entire unit may be placed on a sheet of paper with undersurfaces 217, 218, 219, 252, and 256 all in contact with the paper, so that edges 220 and 248 may be employed for drawing or measuring straight lines or taking other dimensions, without interference being afforded in any way by slides 203 and 204. To facilitate movement of the slides onto head 207, the upper surface of head 207 and the undersurface of slide 202 may be beveled sufficiently as indicated at 257 and 258 in FIG. 2 to enable movement of the slides slightly upwardly as they advance from the rule body onto head 207. Except for the discussed slight elevation of the slide receiving portion of head 207, the head and body are in alignment with one another.

Head 207 is designed for complete detachment from the main slide 202 when the device is being used as a slide rule. For this pupose, the reduced thickness left end portion 259 of slide 202 (FIG. 7) is slidably received within a mating guideway or recess 260 formed in head 207, which recess extends parallel to longitudinal axis 214 of the device and may extend entirely through head 207 to facilitate cleaning of the recess, as by blowing eraser particles or the like therefrom. In the assembled condition of the parts, the extremity of portion 259 may typically project slightly out of the left end of the head as illustrated at 259. Slide 202 is a sufficiently tight frictional fit within recess 260 to frictionally retain the head in fixed position on the slide 202 unless and until the head is forcibly pulled off of the slide as seen in FIG. 7. If desired, an appropriate spring or other means may be provided within the passageway 260 or on a side of portion 259 of slide 202 to attain the required friction fit. The closeness of this fit is such as to maintain the head, when attached to slide 202, in a precisely fixed relative setting in which straight edge 248 of the head extends directly perpendicular to straight edge 220 of the body.

Head 207 may if desired be formed as a single piece of wood or other material, or may include a separately formed band or loop 307 of metal or the like encircling the main portion of the head at its right end (as viewed in FIG. 7) and suitably held in fixed position thereon. This band may thus form an upper side of the entrance portion of passage 260, and may carry and form the previously mentioned beveled surface 257.

The lock screw 216 extends through and threadedly engages a side or end wall 261 (FIG. 1a) of connector 211, and is tightenable against an edge surface 262 of the slide 202 in a relation releasably retaining that slide in any desired set position relative to body 201.

In describing the use of the device, assume first of all that it is desired to employ the device as a beam compass, for drawing a circle or arc of a predetermined radius. To achieve this purpose, external slide 204 may be locked in a particular position on body 201, preferably a setting in which point 206 is aligned with zero point 263 on measuring scale 222, and the second external slide 203 may then be locked in another setting in which the point 205 is spaced from point 206 the desired radial distance, as measured on scale 222. For maximum precision of setting of the point 205, this point may first be retracted into its holder 229 to a position in which its tip is directly opposite and easily readable against the markings on scale 222, following which the point may be slid outwardly to the FIG. 1 position and locked in that setting. Alternatively, the reading of point 205 on scale 222 may be taken very closely without such retraction of the point.

After the points have thus been set and locked in position by their set screws 226 and 246, the point 206 can be placed on a paper surface as seen in FIG. 4, and the lead point 205 may then be swung about point 206 as a center to draw an arc or circle at 264.

The two points may also be employed in caliper fashion for taking measurements on a drawing or an object, with the measurements being read directly on scale 222. Similarly, in accordance with one of the teachings of my prior above mentioned application Ser. No. 115,541, an angle of a desired number of degrees may be measured off by first drawing an arc of a predetermined radius for which scale 223 is calibrated (say a three inch radius), and then measuring off the selected angle along this arc by positioning point 206 at one point on the arc and drawing an intersecting short arc with point 205. If point 206 is located at a zero point on scale 223, the position of point 205 on scale 223 will then indicate the number of degrees in the angle thus measured off.

When the device is to be used as a slide rule, external slide 204 may be moved leftwardly in FIG. 1 to a position beyond all of the slide rule scales on body 201, so that slide 203 and its hairlines can be moved freely to any point on the scales. Preferably, scale 204 is slid onto head 207 and locked thereon during slide rule manipulation of parts 201, 202, and 203. For maximum facility of slide rule use, the head and attached slide 204 may be completely detached from slide 202, to allow movement of slide 202 to a position of rightward projection from the slide rule body as well as a position of leftward projection from the body.

When it is desired to use the slide rule as an extended length beam compass, slide 204 is moved leftwardly onto head 207, and locked in the FIG. 9 position thereon by means of set screw 226; and slide 202 is slid outwardly from guideway 213 to an outwardly projecting position such as that shown in FIG. 9 and locked rigidly in that position by screw 216. Slide 203 is then locked in an appropriate position on body 201, to draw an arc 265 having a radius greater than the maximum radius which is attainable when the two external slides are both carried by body 201.

When the device is to be employed as an ordinary straight edge or ruler, both of the slides 203 and 204 may be moved laterally onto head 207, to the positions illustrated in FIG. 8, and may be locked in those positions by screws 226 and 246, so that straight lines may be drawn or measured along edge 220 of the body without interference by the slides, and with the undersurface of the body being in direct contact with the paper as previously mentioned. Perpendicular lines can be drawn by drawing one line along straight edge 248 and another line along straight edge 220. Also, a series of parallel lines may be drawn by positioning straight edge 248 in alignment with a predrawn vertical line, then drawing a horizontal line along edge 220, then shifting edge 248 downwardly along the mentioned vertical line through a distance measured along scale 250, and then drawing another horizontal line along edge 220 which will be parallel to the first drawn line, etc.

While a certain specific embodiment of the present invention has been disclosed as typical, the invention is of course not limited to this particular form, but rather is applicable broadly to all such variations as fall within the scope of the appended claims.

I claim:

1. A device comprising an elongated rule body containing a longitudinal guideway, an elongated main slide mounted in said guideway for longitudinal sliding movement, logarithmic slide rule scales on said body and main slide readable against one another to make a slide rule calculation, a first external slide mounted for movement longitudinally along said rule body and having marking means for indicating coacting readings on the scales, means for mounting a first compass point to said first external slide, a second external slide mounted for movement along said rule body, means for mounting a second compass point to said second external slide, at least one of said external slides and the carried compass point being movable longitudinally beyond an end of said body, means for connecting said one external slide to a portion of said main slide beyond said body, and means for locking said main slide and the connected external slide in any of a series of different positions within said guideway.

2. A device as recited in claim 1, in which said means for connecting said one external slide to said main slide include an enlarged head carried by an end of said main slide and about which said one external slide is detachably receivable.

3. A device as recited in claim 2, including means releasably securing said head to said end of the main slide.

4. A device as recited in claim 1, in which said means for connecting said one external slide to said main slide include an enlarged head carried by an end of said main slide and about which said one external slide is detachably receivable, and a lock screw for manually locking said one external slide in fixed position on said head and also locking said one external slide in fixed position on said body, there being a second lock screw for securing the other of said external slides in fixed position on said body, said means for locking said main slide in fixed position within said guideway including a third lock screw.

5. A device comrpising an elongated rule body containing a longitudinal guideway, an elongated main slide mounted in said guideway for longitudinal sliding movement, logarithmic slide rule scales on said body and main slide readable against one another to make a slide rule calculation, a second slide mounted to said body for sliding movement therealong and having marking means coacting with said scales to indicate aligned readings thereon, means for mounting a compass point to said second slide, a third slide mounted to said body for longitudinal sliding movement therealong, means for mounting another compass point to said third slide, an enlarged head carried by one end of said main slide at a location beyond said body, and means detachably securing said head to said main slide.

6. A device as recited in claim 5, in which at least one of said second and third slides is movable beyond said rule body to a retracted position of reception about said head.

7. A device as recited in claim 6, in which said head has a straight edge extending transversely of said main slide and transversely of a straight edge formed along said rule body.

8. A device comprising an elongated rule body containing a longitudinal guideway, an elongated main slide mounted in said guideway for longitudinal sliding movement, logarithmic slide rule scales on said body and said main slide readable against one another to make a slide rule calculation, a first external slide extending essentially about the outside of said body and slidable longitudinally therealong and having marking means coacting with said slide rule scales to indicate corresponding readings thereon, means for mounting a first compass point to said first external slide, a second external slide extending essentially about the outside of said body and slidable longitudinally therealong relative to said body and relative to said first external slide, means for mounting a second compass point to said second external slide, and an enlarged head carried by said main slide at one end thereof and longitudinally beyond said body.

9. A device as recited in claim 8, including a connection securing said head to said main slide removably.

10. A device as recited in claim 8, in which said enlarged head has a recess removably and frictionally receiving said end of said main slide in a relation frictionally holding said head on the main slide but enabling forced separation of the head from the main slide when desired.

11. A device as recited in claim 8, in which both of said external slides are movable longitudinally off of said slide body and to a retracted position of reception about said enlarged head.

12. A device as recited in claim 8, in which both of said external slides are movable longitudinally off of said slide body and to a retracted position of reception about said enlarged head, said head being shaped to receive said external slides in positions in which they are located slightly higher than they are when received about said body and in a relation avoiding interference with engagement of an undersurface of said body with a sheet of paper.

13. A device as recited in claim 12, including a connection securing said enlarged head to said end of the main slide detachably.

14. A device as recited in claim 13, including means for releasably locking said main slide in any of a series of different longitudinal settings within said guideway.

15. A device as recited in claim 14, including lock screws for releasably securing said two external slides in any of a series of different positions along said body and for releasably locking said external slides in fixed positions on said head, ther being a measuring scale on said rule body coacting with points carried by said external slides to indicate the distance therebetween in any of different settings of the points.

* * * * *